(12) United States Patent
Haupt et al.

(10) Patent No.: US 12,374,171 B2
(45) Date of Patent: Jul. 29, 2025

(54) GENERATION OF TEST DATA HAVING CONSISTENT INITIAL CONDITIONS FOR STIMULATING A CONTROL UNIT TO BE TESTED

(71) Applicant: dSPACE GmbH, Paderborn (DE)

(72) Inventors: Hagen Haupt, Paderborn (DE); Frank Schuette, Paderborn (DE)

(73) Assignee: dSPACE GMBH, Paderborn (DE)

( * ) Notice: Subject to any disclaimer, the term of this patent is extended or adjusted under 35 U.S.C. 154(b) by 292 days.

(21) Appl. No.: 18/082,778

(22) Filed: Dec. 16, 2022

(65) Prior Publication Data

US 2023/0196849 A1 Jun. 22, 2023

(30) Foreign Application Priority Data

Dec. 17, 2021 (EP) .................................... 21215409

(51) Int. Cl.
*G07C 5/02* (2006.01)
*B60W 50/00* (2006.01)
*G05B 15/02* (2006.01)

(52) U.S. Cl.
CPC .............. *G07C 5/02* (2013.01); *G05B 15/02* (2013.01); *B60W 50/0098* (2013.01)

(58) Field of Classification Search
CPC ...... G07C 5/02; G05B 15/02; B60W 50/0098
See application file for complete search history.

(56) References Cited

U.S. PATENT DOCUMENTS

| | | | |
|---|---|---|---|
| 10,482,003 B1 * | 11/2019 | Bondor | G06F 11/3684 |
| 11,150,660 B1 * | 10/2021 | Kabirzadeh | G06F 30/15 |
| 2019/0164007 A1 * | 5/2019 | Liu | G06V 20/54 |
| 2019/0228571 A1 * | 7/2019 | Atsmon | G01C 21/3815 |
| 2019/0354643 A1 | 11/2019 | Shum et al. | |
| 2020/0184027 A1 | 6/2020 | Dolan | |
| 2020/0339109 A1 | 10/2020 | Hong et al. | |
| 2021/0166474 A1 | 6/2021 | Behar et al. | |

FOREIGN PATENT DOCUMENTS

| | | |
|---|---|---|
| DE | 102019124504 A1 | 4/2021 |
| WO | WO2020264276 A1 | 12/2020 |

\* cited by examiner

*Primary Examiner* — Naeem Taslim Alam
(74) *Attorney, Agent, or Firm* — Muncy, Geissler, Olds & Lowe, P.C.

(57) ABSTRACT

A method for processing raw data recorded from the real world with the aid of a sensor into test data for stimulating a control unit, including: providing recorded raw data from the real world; ascertaining real objects detected by the sensor from the raw data, and generating route data sets, which each describe a scene including images of these real objects at consecutive points in time. providing a library of synthetic objects; assigning synthetic objects to detected images of the real objects, replacing the detected images with synthetic objects; supplementing temporally consecutive route data sets with supplementary data sets before the first route data set; and generating test data by converting the route data sets supplemented by the supplementary data sets into raw data that would have been recorded in the real world by the sensor during the introductory period and the recording period.

10 Claims, 6 Drawing Sheets

GENERATION OF TEST DATA HAVING CONSISTENT INITIAL CONDITIONS FOR STIMULATING A CONTROL UNIT TO BE TESTED

This nonprovisional application claims priority under 35 U.S.C. § 119(a) to European Patent Application No. 21215409.0, which was filed on Dec. 17, 2021, and which is herein incorporated by reference.

BACKGROUND OF THE INVENTION

Field of the Invention

The present invention relates to a method for processing recorded raw data from the real world with the aid of a sensor into test data for stimulating a control unit to be tested, including the following method steps: providing recorded raw data from the real world, which were recorded along a recording route from at least one portion of the surroundings of the recording route with the aid of a sensor for a recording period, and which have temporally consecutive data value sets which resulted on the basis of real objects detected by the sensor; and ascertaining the real objects detected by the sensor from the temporally consecutive data value sets and generating temporally consecutive route data sets, which each describe a scene, including images of these real objects at consecutive points in time.

Description of the Background Art

In the areas of "advanced driver assistance systems" (ADAS) and "autonomous driving," the validation of sensor, sensor fusion, and perception components is an important and safety-critical undertaking. Due to the complexity and criticality of this validation, the safety and accuracy thereof must meet very strict requirements. Recorded data from the real world is frequently used to meet these requirements, i.e., data that has been detected while driving using a real motor vehicle in the real world with the aid of sensors mounted on the motor vehicle. Data recorded in this way is characterized by a reality approximation and realism, which is not achievable using synthetic simulation data according to the prior art. The validation and testing of ADAS/AD perception and sensor fusion components by reproducing recorded data, also known as data reprocessing, data resimulation, data reproduction, and data replay, is thus an important aspect in the development of ADAS/AD systems.

Achieving high precision and realism is complex and demanding. The system to be tested must be supplied with the recorded data, in principle, such as would be the case in a real test drive. Heterogeneous data streams, including sensor and network/bus data, must be synchronized during the data reproduction process, although their packet/message sizes may vary. In addition, the sheer quantity of the streamed data increases steadily. A further challenge is the complex real-time adaptation of the recorded data in order to pass the end-to-end encryption and the safety tests in the system to be tested (SUT). Moreover, the efficient scaling of the test to continuously supply millions of kilometers driven and to orchestrate multiple test systems is crucial.

Different solutions are known from the prior art for various applications of the data reproduction, regardless of whether the SUT is physically available (hardware in the loop—HIL) or is still in the early software development phase (software in the loop—SIL), and whether the system is a simple sensor component or a complex central calculation platform for autonomous driving.

Conventional simulation systems make it possible to stimulate control units using synthetic sensor raw data. However, if the initial state of the scenario on whose basis the raw data are generated is implausible, the control unit present in the test or a component connected downstream from the control unit may not process the situation, and the test therefore fails. This may be the case, in particular, if the simulation begins while the virtual test vehicle is traveling at full speed, or if objects in the surroundings being driven through suddenly appear, disappear, or jump from one location to another in an unnatural manner.

SUMMARY OF THE INVENTION

It is therefore an object of the present invention to provide a method for generating test data for a control unit to be tested, which do not have implausibilities, based on which a test of the control unit to be tested would be aborted.

According to an exemplary embodiment of the invention, a method is thus provided for processing raw data recorded from the real world with the aid of a sensor into test data for stimulating a control unit to be tested, including the following method steps: providing recorded raw data from the real world, which were recorded along a recording route from at least one portion of the surroundings of the recording route with the aid of a sensor for a recording period, and which have temporally consecutive data value sets which resulted on the basis of real objects detected by the sensor; ascertaining real objects detected by the sensor from the temporally consecutive data value sets and generating temporally consecutive route data sets, which each describe a scene, including images of these real objects at consecutive points in time; providing a library of synthetic objects; ascertaining the absolute velocity of the sensor along the recording route at point in time zero of the recording period and in the event that the absolute velocity of the sensor along the recording route at point in time zero is other than zero at point in time zero of the recording period, supplementing the temporally consecutive route data sets with temporally consecutive supplementary data sets for an introductory period before the first route data set in such a way that the sensor has an absolute velocity of zero at point in time zero of the introductory period, and the temporally consecutive supplementary data sets include synthetic objects which demonstrate a quasi-continuous temporal sequence of movements between temporally directly consecutive supplementary data sets, the sequence of movements quasi-continuously resulting in the images of the real objects of the first route data set at point in time zero of the recording period; and generating the test data for stimulating a control unit to be tested by converting the supplementary data sets into raw data which would have been recorded in the real world during the introductory period with the aid of the sensor if the sensor had detected the synthetic objects in the temporally consecutive supplementary data sets as real objects, and supplementing the recorded raw data with the raw data obtained by converting the supplementary data sets before the first route data set at point in time zero of the recording period.

To achieve the aforementioned object, the invention thus proposes to automatically set up an "introductory scenario," which starts from a plausible initial state and transitions seamlessly into the initial state of an original scenario which resulted on the basis of the raw data recorded from the real world with the aid of the sensor. The invention is useful, in particular, for data replay, if the recording of the raw data begins in the middle of the trip, or if only a section of a recording is to be used. According to the invention, the recorded raw data is supplemented with an introductory scenario including virtual scenarios, so that the result may be reconverted into a quasi raw data format having a plausible initial state.

If the sensor moves through its surroundings along the recording route during the recording of the raw data, the relative movement of the objects detected by the sensor with respect to the sensor is always continuous in the mathematic sense in the real world. This is true regardless of whether the detected objects themselves do or do not move in the surroundings. Since a recording of the data from the real world takes place, of course, discretely in the present case, namely with temporally consecutive data value sets, discontinuities in the mathematical sense always exist from data value set to data value set at a relative velocity other than zero between the sensor and a real object detected. Within the scope of the present invention, the term "quasi-continuously" is therefore used to describe the fact that, like in the real world, the objects namely do not suddenly appear and also do not suddenly disappear again. In addition, the objects also do not jump from one location to another. Instead, in generating the supplementary data sets, as in the real world, the invention strives for a movement of the objects relative to the sensor, which is "quasi-continuous" in the sense that, in a visual representation of the supplementary data sets up to the first route data set, a continuous movement would be perceived by the human observer as in a film having temporally consecutive individual images (frames).

An important aspect of the present invention is therefore that, in the event that the velocity of the sensor is other than zero in the first (earliest) route data set, i.e., at point in time zero of the recording period, introductory data sets are inserted before the route data sets, which lead to the first route data set in a quasi-continuous manner. This applies with regard to a quasi-continuous relative movement of all objects relative to the sensor as well as with regard to a starting situation of the sensor in the first supplementary data set, which is to begin at a velocity of zero.

The absolute velocity of the sensor is thus the velocity of the sensor relative to objects in the surroundings of the sensor which do not themselves move in the surroundings. If the data recorded from the real world are data which have been recorded with the aid of a sensor mounted on a motor vehicle while driving along a road, the real objects which do not move in the surroundings are, for example, the road itself as well as fixed facilities in the surroundings, such as buildings, or vegetation. Objects which move within the surroundings may be, for example, other road users, such as other motor vehicles or pedestrians. The term "absolute velocity" can thus refer to the velocity of the sensor or, in the case described above, the velocity of the motor vehicle carrying the sensor relative to fixed facilities in the surroundings.

It should furthermore be noted that the term "image of a real object" may be understood in the mathematical sense. It is therefore not necessarily a visual representation of a real object in the sense of a graphical representation. Instead, the images of the real objects are data, namely part of the route data, and insofar result from the data value sets recorded by the sensor with the aid of a mathematical mapping rule, which is dependent on the particular sensor, the data value sets having resulted on the basis of real objects detected by the sensor. It is equally possible, of course, that the images of the real objects are represented graphically.

The term "route data sets, which each describe a scene including images of these real objects at consecutive points in time" can mean that the route data sets contain, on the one hand, information that describes the type or properties of the real objects, such as their shape, and, on the other hand, information which indicates the position of a real object of this type within the recorded scene. This information may generally be present in entirely different forms. According to an example, it is provided that the route data sets, which each describe a scene including images of these real objects at consecutive points in time, are formed by temporally consecutive frames, which each contain a visual representation of the scene. The consecutive frames (individual images) thus virtually form a film of what has been recorded by the sensor during its movement along the recording route. The images of the real objects are represented graphically. However, this graphical representation is only one option of the invention; a visual representation of scenes is namely not absolutely necessary.

The invention also relates to the use of test data obtained according to a method described above for stimulating a control unit to be tested. Within the scope of a use of this type, it is preferably provided that the method has the following steps: testing a control unit using test data which have been obtained according to one of the preceding claims; and if, during the application of the test data, the control unit demonstrates that it does not accept the test data like the raw data recorded in the real world, repeating the method steps described in detail above of providing recorded raw data from the real world; ascertaining real objects recorded by the sensor from the temporally consecutive data value sets, and generating temporally consecutive route data sets, which each describe a scene including images of these real objects at consecutive points in time; providing a library of synthetic objects; supplementing the temporally consecutive route data sets; and generating the test data for stimulating a control unit to be tested. In this connection, it is greatly particularly preferred that, when repeating these method steps, images of virtual objects are formed similarly to the real objects corresponding to them. Additionally or alternatively, when repeating these method steps, images of virtual objects of this type are preferably inserted, which have previously not been used, for example, due to apparently too small a size or an assumed irrelevance of the real objects corresponding to them.

The invention also relates to a nonvolatile, computer-readable memory medium including commands stored thereon, which, when executed on a processor, effectuate a method described above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
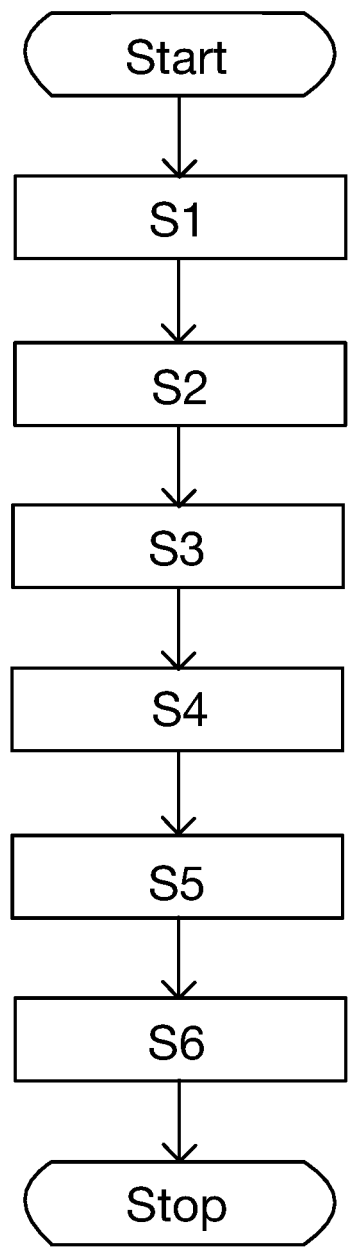
FIG. 1 schematically shows a flowchart of a method for processing raw data recorded from the real world with the aid of a sensor into test data for stimulating a control unit to be tested according to an example.

A flowchart of a method for processing raw data recorded from the real world with the aid of a sensor into test data for stimulating a control unit to be tested is schematically apparent from FIG. 1. This control unit may be, for example, a control unit which performs tasks in the area of "advanced driver assistance systems" (ADAS) and "autonomous driving" (AD) in a motor vehicle, and which, for example, intervenes in the steering and velocity control of the motor vehicle.

This method includes the following method steps:

In method step S1, previously recorded raw data are provided from the real world, which were recorded with the aid of a sensor for a certain recording period along a certain recording route from a portion of the surroundings of the recording route. The recording route was thus previously driven with a motor vehicle, which includes a corresponding sensor for detecting at least one portion of the surroundings of the recording route. In this way, temporally consecutive data value sets were generated, which have resulted on the basis of real objects detected by the sensor. It is, of course, possible and also preferred within the scope of the invention that the motor vehicle, with which the route was previously driven for the purpose of the recording, includes more than one sensor for detecting the surroundings of the recording route.

In method step S2, real objects detected by the sensor are subsequently ascertained from the temporally consecutive data value sets, and temporally consecutive route data sets are generated, which each describe a scene containing images of these real objects at consecutive points in time. These route data sets thus represent a reproduction of the surroundings detected while driving along the recording route.

In method step S3, a library of synthetic objects is then provided. These synthetic objects are, in principle, also images of real objects, but they are not a direct reproduction of a particular real object. If a synthetic object represents, for example, another motor vehicle, the library of synthetic objects will include only a finite number of synthetic objects of this type, each of which is to represent one motor vehicle. synthetic objects of this type typically each describe a class of motor vehicles, such as "compact car," "station wagon," sedan," "SUV," "minivan," "truck." In practical terms, the synthetic objects thus represent simplified images of the real objects. This applies similarly to synthetic objects which represent static objects, for example buildings or vegetation, in the surroundings of the recording route. The synthetic objects may be stored, in particular, as 3D objects, based on which a graphic engine may render a two-dimensional view of a given object from a arbitrary perspective in a data format corresponding to the recorded raw data.

In method step S4, the absolute velocity of the sensor along the recording route is subsequently ascertained at point in time zero of the recording period. In the event that the absolute velocity of the sensor along the recording route is other than zero at point in time zero of the recording period, the temporally consecutive route data sets are supplemented with temporally consecutive supplementary data sets for an introductory period before the first route data set in such a way that the sensor has an absolute velocity of zero at point in time zero of the introductory period, and the temporally consecutive supplementary data sets include synthetic objects which demonstrate, between directly consecutive supplementary data sets, a quasi-continuous temporal sequence of movements which quasi-continuously leads to the images of the real objects of the first route data set at point in time zero of the recording period. This is therefore the method step in the method described above, in which a plausible introductory scenario is created to avoid implausible states, which would not be accepted by the control unit to be tested later on.

In method step S5, the test data are then generated for stimulating a control unit to be tested by converting the supplementary data sets into raw data which would have been recorded in the real world during the introductory period with the aid of the sensor if the sensor had detected the synthetic objects as real objects in the temporally consecutive supplementary data sets. In step S6, the recorded raw data are then supplemented with the raw data obtained by converting the supplementary data sets before the first route data set at point in time zero of the recording period. In this way, implausible states during the testing of the control unit may be avoided, which would otherwise result in an aborting of the test of the control unit.

Figure 2:
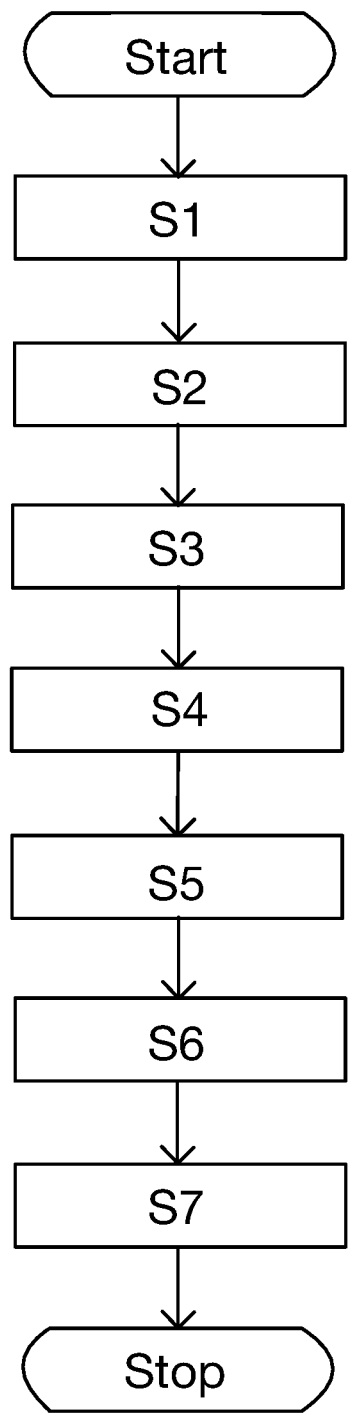
FIG. 2 schematically shows a flowchart of a method for processing raw data recorded from the real world with the aid of a sensor into test data for stimulating a control unit to be tested according to an example.

This ends the method currently under discussion for processing the raw data recorded from the real world with the aid of the sensor into test data for stimulating the control unit to be tested. The test data generated in this way may be used multiple times and also for different control units to be tested. In addition, different sets of test data may be generated by driving along different recording routes for the purpose of testing control units of this type. The invention thus makes it possible to generate different sets of test data, which are stored in a separate library and may be used as needed for testing control units. It is, of course, equally possible, as shown schematically in the flowchart illustrated in FIG. 2, to subsequently test a control unit after generating the test data directly in a method step S7.

A method of this type is explained as an example below, based on the creation of an introductory scenario for a recording of radar raw data.

Figure 3:
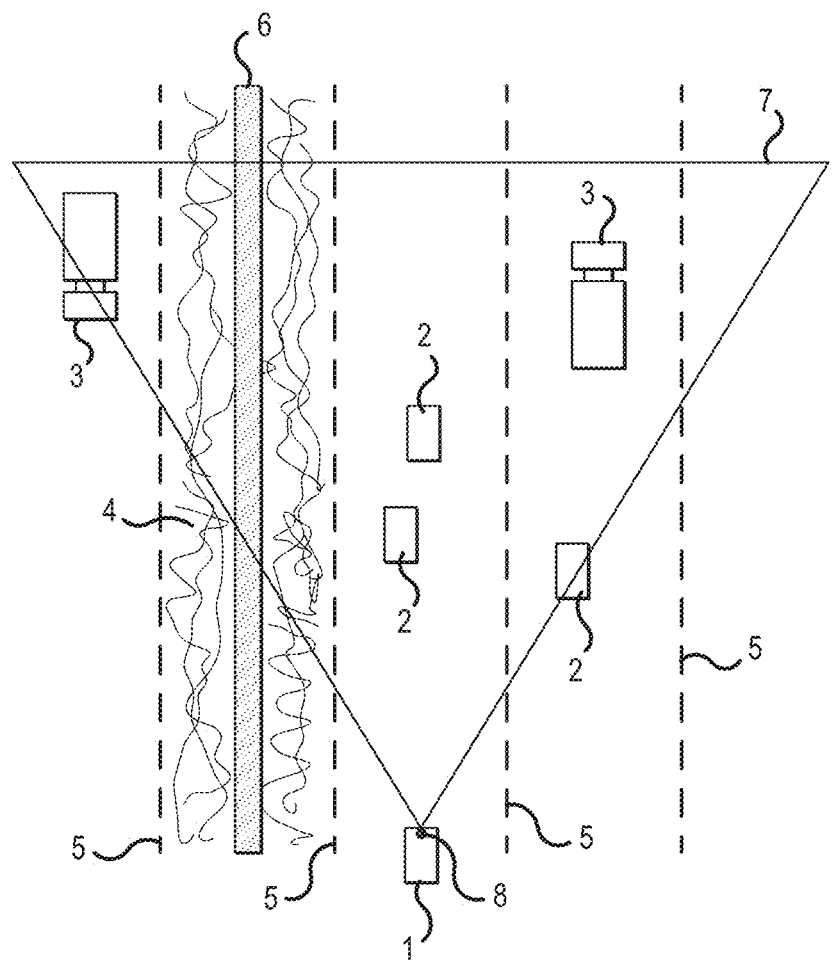
FIG. 3 shows a semantic description of an initial real traffic situation, which corresponds to the target situation of the introductory scenario.

FIG. 3 shows a semantic description of the traffic situation as present in the first route data set at point in time zero of the recording period of the raw data recording. Instead of the term "route data set," the term "frame" will be used below. This situation in the first route data set or in the first frame, is the target situation, in which the introductory scenario is to be introduced as seamlessly as possible. To reconstruct the traffic scenario, not only the radar sensor but also other sensors may be used as support, for example a forward-directed camera, which also runs during the test drive. The semantic description of the target situation comprises a designation (label), a position, and a velocity for each object detected. The introductory scenario comprises the position of real vehicle 1, with which the route data sets were ascertained, images of other passenger cars 2, images of trucks 3, images of vegetation 4, images of lane boundaries 5, if the data do to originate exclusively from a radar sensor, and an image of a guardrail 6. For illustrative purposes, view cone 7 of radar sensor 8 is also drawn in FIG. 3, which is carried by vehicle 1 and was recorded together with the data.

To set up the introductory scenario in a first step, a virtual reconstruction of a road section 10 takes place, which matches the road in the target situation, i.e., including a corresponding number of lanes of a suitable width. This is apparent schematically from FIG. 4. The length of road section 10 should be selected in such a way that, in each case, enough room remains for all synthetic objects which are to lead to the images of the real objects of the first route data set at point in time zero of the recording period, in particular to such images which represent the dynamic objects and which move absolutely within the space of the scenario, A virtual test vehicle 9, also referred to as an ego vehicle, is positioned on the road at the transverse position, which corresponds to the position of real test vehicle 1 in the target scenario, and it then accelerates from zero to the target velocity, i.e., the velocity of the test vehicle in the target scenario (in the first route data set). Virtual test vehicle 9 is equipped with a virtual radar sensor 11 at the exact position where real radar sensor 8 was mounted in the test vehicle.

Figure 5:
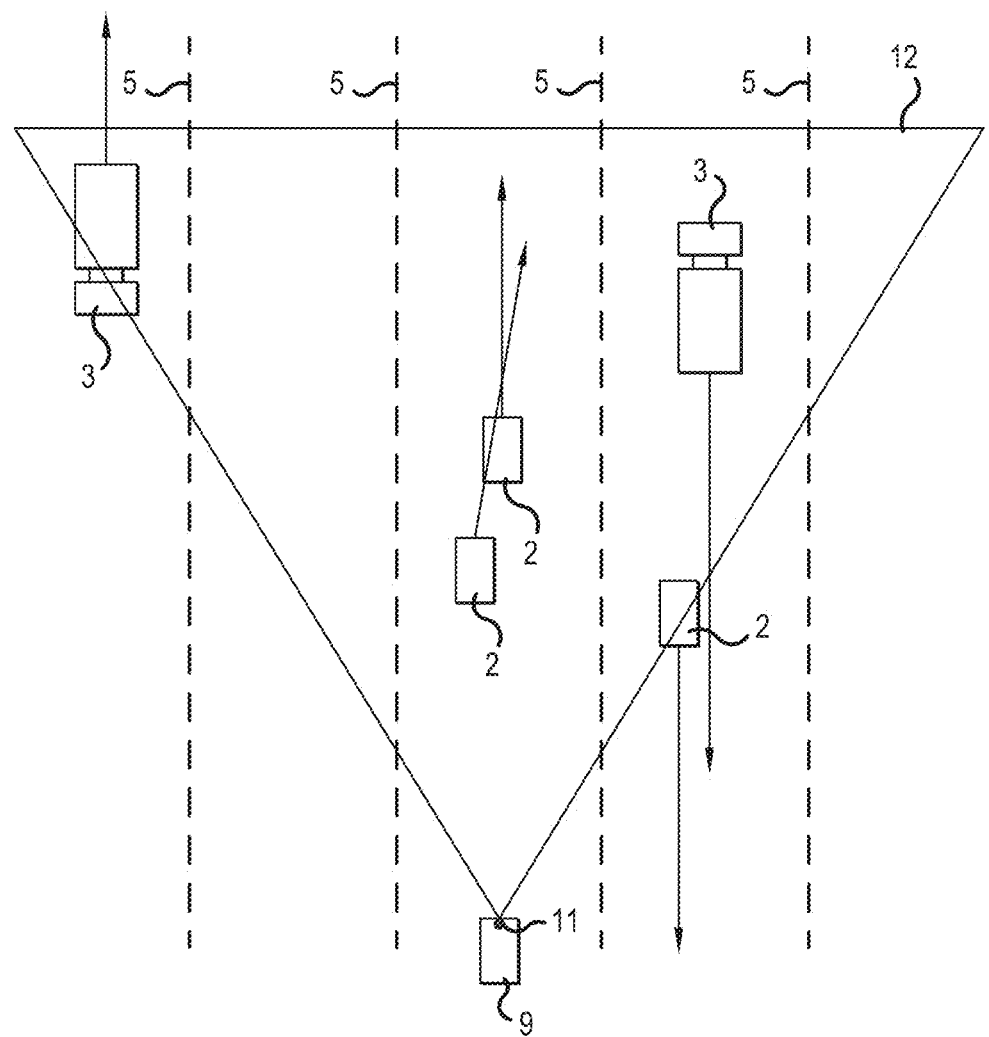
FIG. 5 shows a semantic description of dynamic objects in the introductory scenario.

If virtual test vehicle 9 is adjusted to the target velocity, a suitable virtual object, which generates a similar radar image, is positioned at the same relative position for each dynamic object from the target situation, as illustrated schematically in FIG. 5. Each dynamic object is then moved to a starting position in the target scenario by backward extrapolation, illustrated by arrows in the figure, of the particular dynamic object, based on its absolute velocity. The extrapolation is continued until all initial positions are outside view cone 12 of virtual radar sensor 11.

If the relative velocity of a dynamic object is equal to zero or approximately equal to zero, this object is positioned just outside view cone 12 of virtual radar sensor 11 and provides a controller, which activates the object, with the relative target position of the object as a setpoint value.

Figure 4:
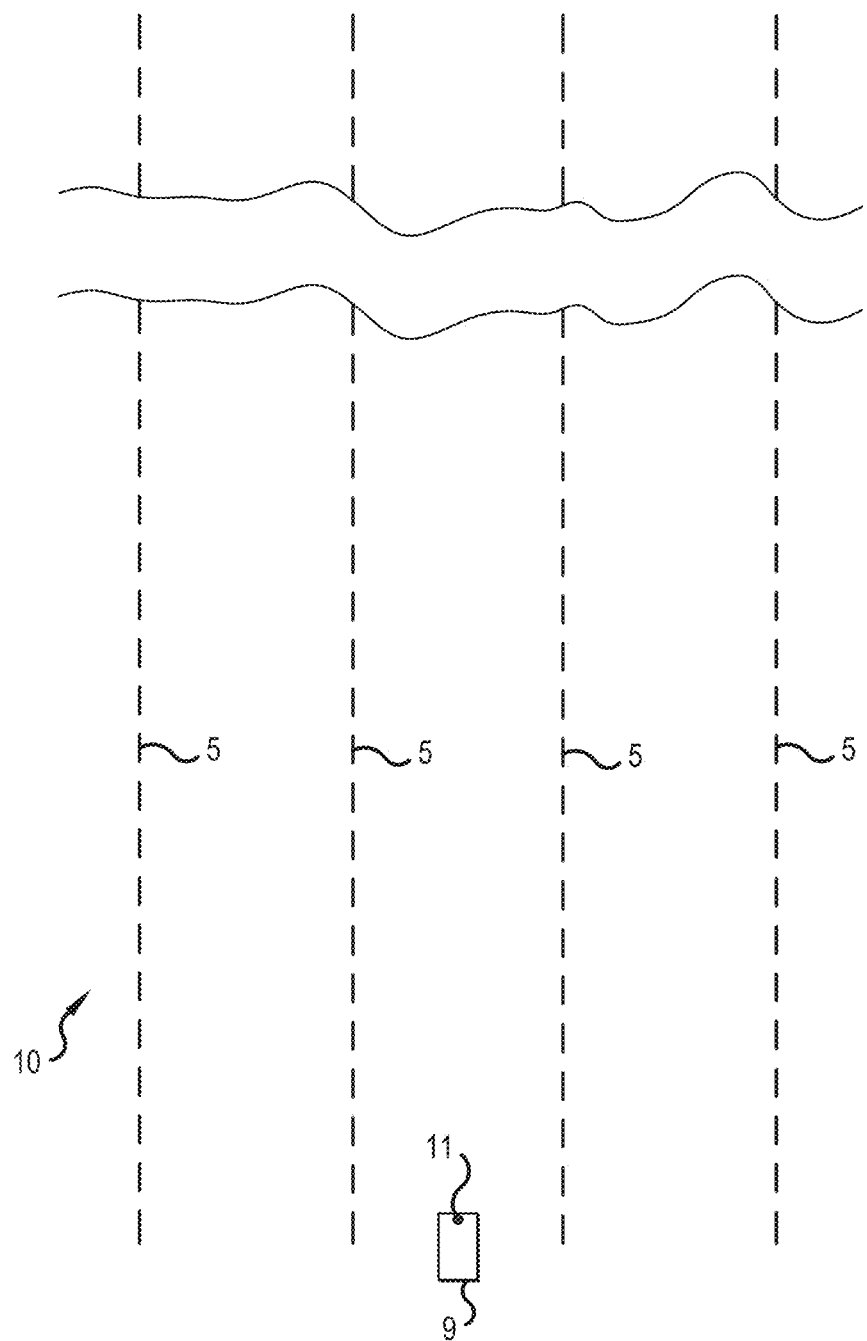
FIG. 4 shows a semantic description of the layout of the road in the introductory scenario.
Figure 6:
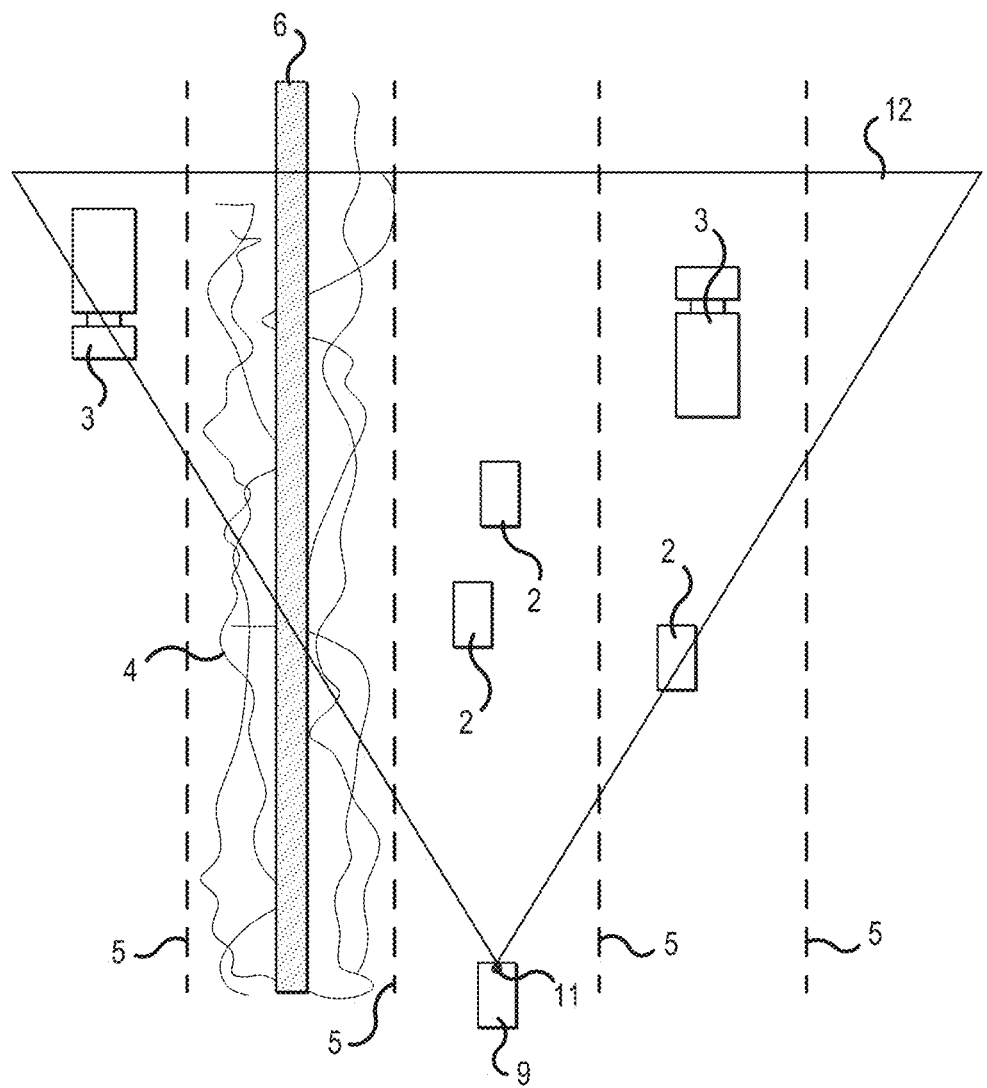
FIG. 6 shows a semantic description of the entire introductory scenario.

The scenes from FIG. 4 and FIG. 5 are now combined into a scenario, as shown in FIG. 6, until all dynamic objects are at the correct target position. It is also apparent from FIG. 6 that, starting the position where virtual test vehicle 9 was placed, the introductory scenario is now filled with static objects from the target scenario, so that, in the final frames of the introductory scenario, at least the most important static objects are already visible which are also visible in the first frame, i.e., in the first route data set, which corresponds to the target scenario, and no static objects appear out of nowhere. It is shown by way of example that, in the immediate surroundings of the target position of virtual test vehicle 9, which the latter occupies in the last frame of the introductory scenario, the introductory scenario is filled with synthetic counter-pieces of guardrail 6 and vegetation 4.

The introductory scenario is then simulated, this simulation is converted into a synthetic radar raw data recording, and the real recording is then appended in front thereof, so that they both merge with each other seamlessly. This is followed by a test phase, in which it is tested whether a control unit to be tested accepts the introductory scenario, i.e., whether the transition from the introductory scenario into the real recording takes place without an error message or unusual behavior on the part of the control unit.

If this is the case, the method is concluded. If not, it is improved. For example, virtual objects, i.e., static and/or dynamic objects, are structured in a similar way as their real counter-pieces from the recording, and/or further static objects are inserted, which were previously ignored due to their small radar cross-section. The following principle applies: Greater care is taken in the case of the objects which are of interest from the perspective of the particular control unit. For example, an algorithm of a lane keeping assistant will pay special attention to boundaries of the lane, such as edge lines, guardrails, curbs, etc., and other objects tend to be ignored, such as vehicles, pedestrians, and vegetation. Improvements continue to be made until the particular control unit accepts the introductory scenario.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for processing raw data recorded from the real world with the aid of a sensor into test data for stimulating a control unit to be tested, the method comprising:

providing recorded raw data from the real world, which were recorded along a recording route from at least one portion of the surroundings of the recording route with the aid of a sensor for a recording period, and which include temporally consecutive data value sets which resulted from real objects detected by the sensor;

ascertaining the real objects detected by the sensor from the temporally consecutive data value sets and generating temporally consecutive route data sets, which each describe a scene, including images of the real objects at consecutive points in time;

providing a library of synthetic objects;

ascertaining an absolute velocity of the sensor along the recording route at a point in time zero of the recording period and in an event that the absolute velocity of the sensor along the recording route at the point in time zero is other than zero at the point in time zero of the recording period, supplementing the temporally consecutive route data sets with temporally consecutive supplementary data sets before a first route data set in such a way that the sensor has an absolute velocity of zero at a point in time zero of an introductory period, and the temporally consecutive supplementary data sets include synthetic objects which demonstrate a quasi-continuous temporal sequence of movements between temporally directly consecutive supplementary data sets, the sequence of movements quasi-continuously resulting in the images of the real objects of the first route data set at the point in time zero of the recording period; and generating the test data for stimulating the control unit to be tested by converting the supplementary data sets into raw data which would have been recorded in the real world with the aid of the sensor during the introductory period if the sensor had detected the synthetic objects in the temporally consecutive supplementary data sets as real objects; and supplementing the recorded raw data with the raw data obtained by converting the supplementary data sets before the first route data set at the point in time zero of the recording period.

2. The method according to claim 1, wherein the route data sets, which each describe a scene including images of the real objects at consecutive points in time, are formed by temporally consecutive frames, which each contain a virtual representation of the scene.

3. The method according to claim 1, wherein the synthetic objects, which show, between temporally directly consecutive supplementary data sets, a quasi-continuous temporal sequence of movements, which quasi-continuously lead to the images of the real objects of the first route data set at point in time zero of the recording period, are selected in such a way that the synthetic objects are seen as being in a predetermined range of similarities with the images of the real objects to which they lead within the scope of an assessment with the aid of a predetermined metric or within the scope of an assessment by a correspondingly trained artificial neural network.

4. The method according to claim 3, wherein a synthetic object is seen as being within the predetermined range of similarities with an image of a real object, if raw data which was recorded from a real object with the aid of the sensor corresponds to the synthetic object within a predetermined range of similarity, the raw data having been recorded by the sensor from the real object to whose image the synthetic object leads.

5. The method according to claim 1, wherein the sensor includes a radar sensor, a LIDAR sensor, a camera, and/or an ultrasonic sensor.

6. The method according to claim 1, further comprising:
testing the control unit using the test data; and
repeating the method steps of claim 1 if the control unit demonstrates, during application of the test data, that it does not accept the test data as raw data recorded in the real world.

7. The method according to claim 6, wherein, during the repetition of the method steps of claim 1, images of virtual objects are made more similar to the real objects corresponding to the images of the virtual objects.

8. The method according to claim 6, wherein, during the repetition of the method steps of claim 1, images of virtual objects are inserted which were previously not used, due to too small a size of the real objects corresponding to the virtual objects.

9. A nonvolatile, computer-readable memory medium having commands stored thereon which, when executed on a processor, effectuate a method according to claim 1.

10. A non-volatile, computer-readable memory medium having test data stored thereon, which were obtained according to claim 1.

* * * * *